Oct. 11, 1932. C. H. HOMAN 1,881,629
BUMPER GRINDING MACHINE
Filed Jan. 18, 1926 8 Sheets-Sheet 5
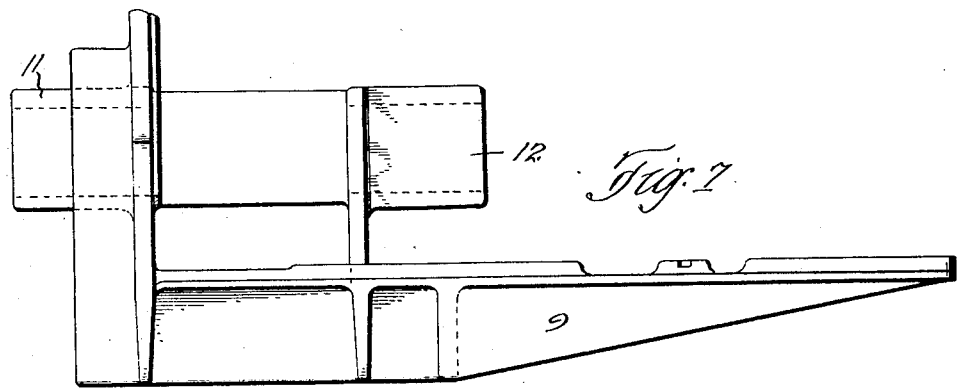
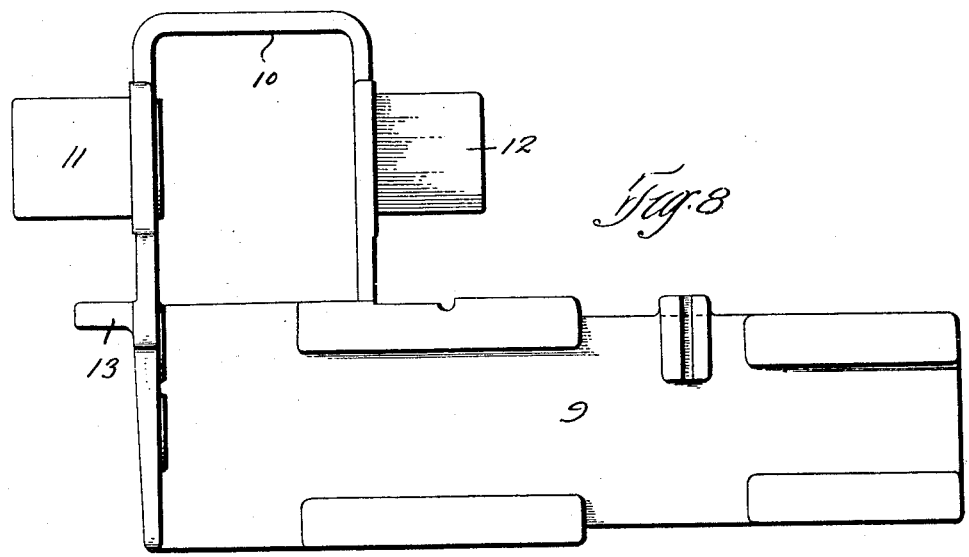
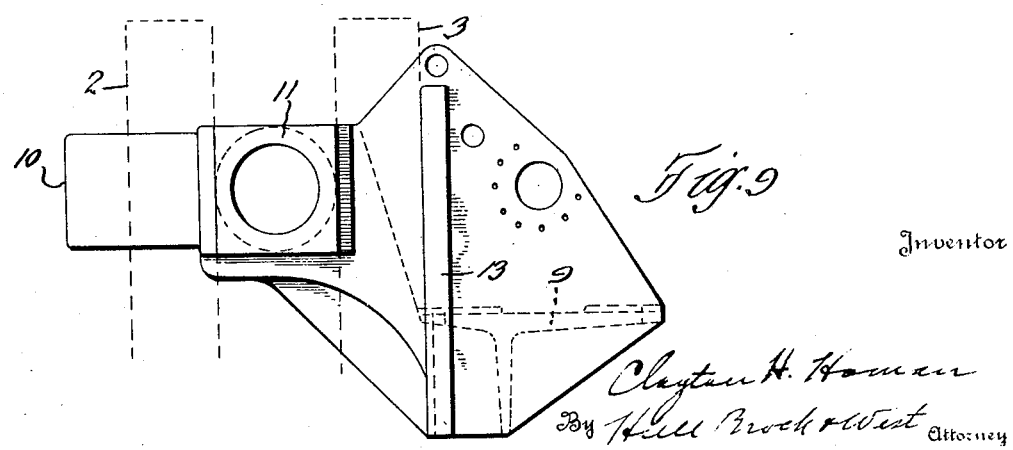

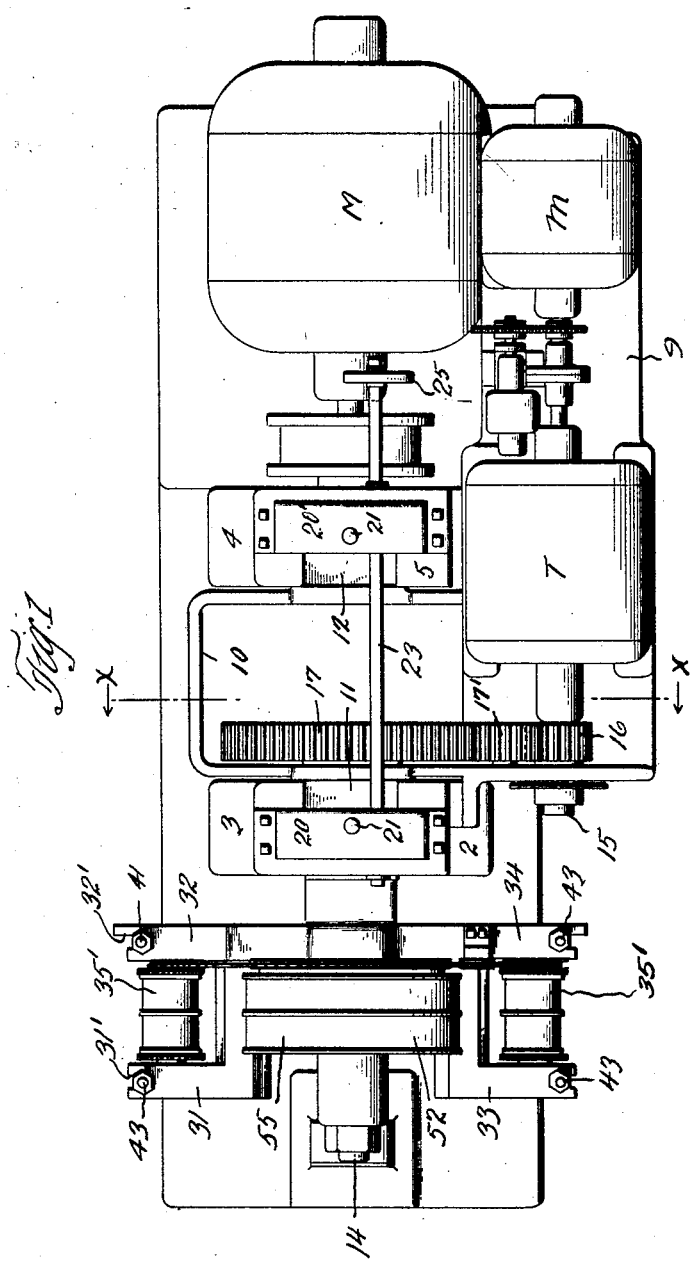

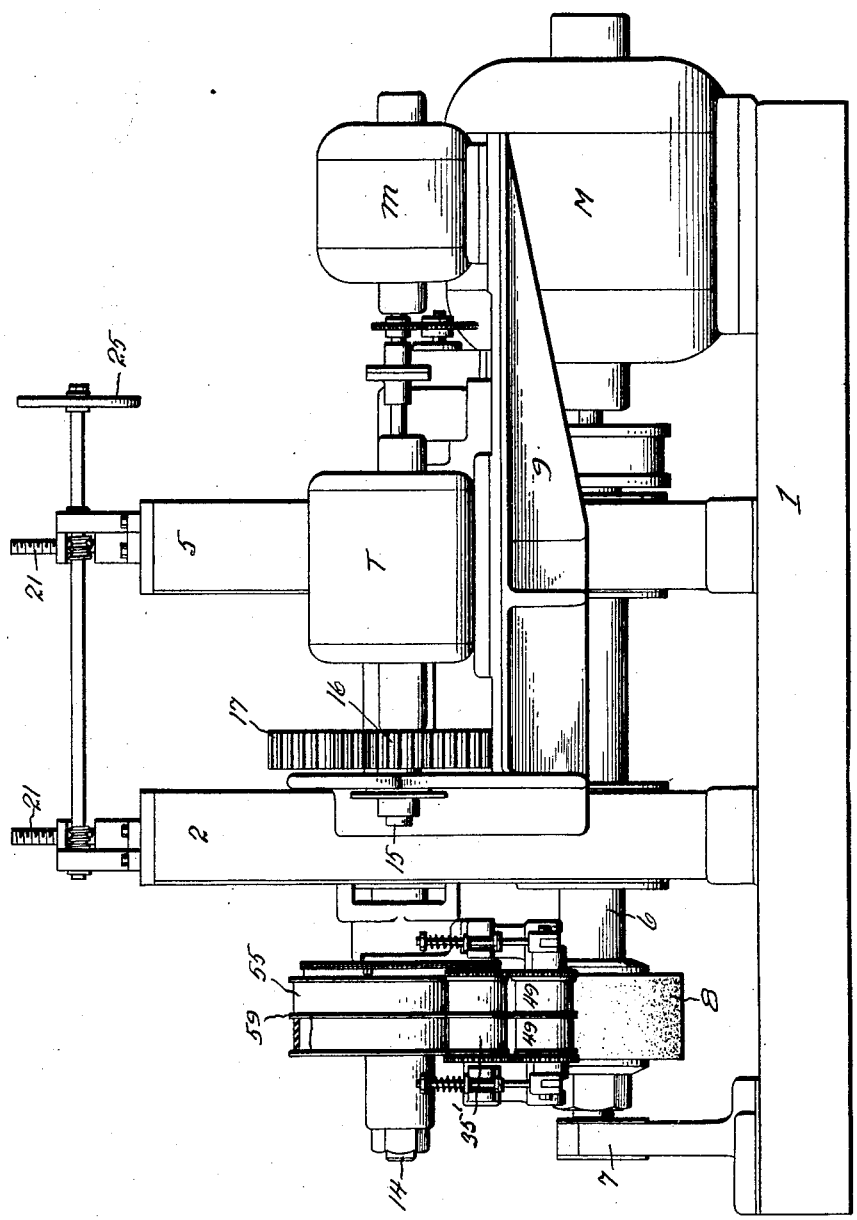

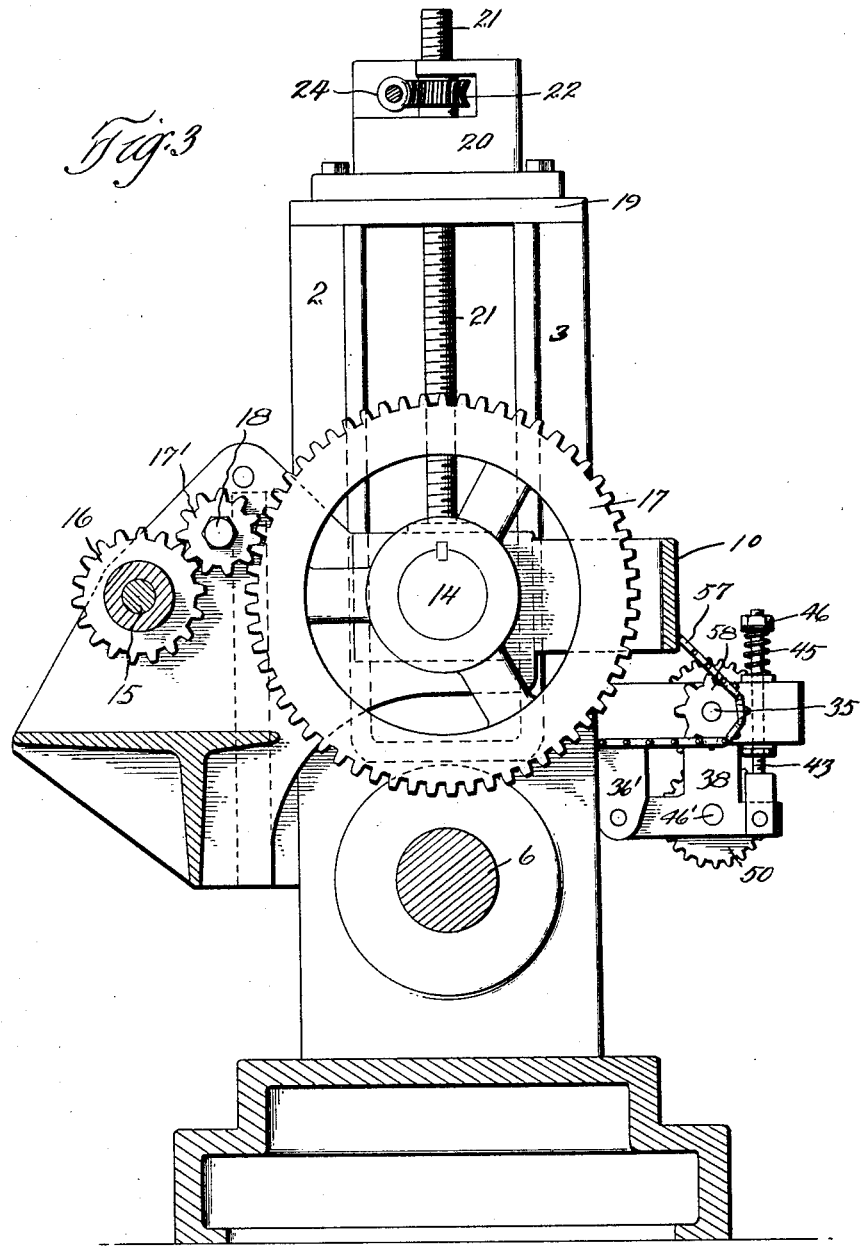

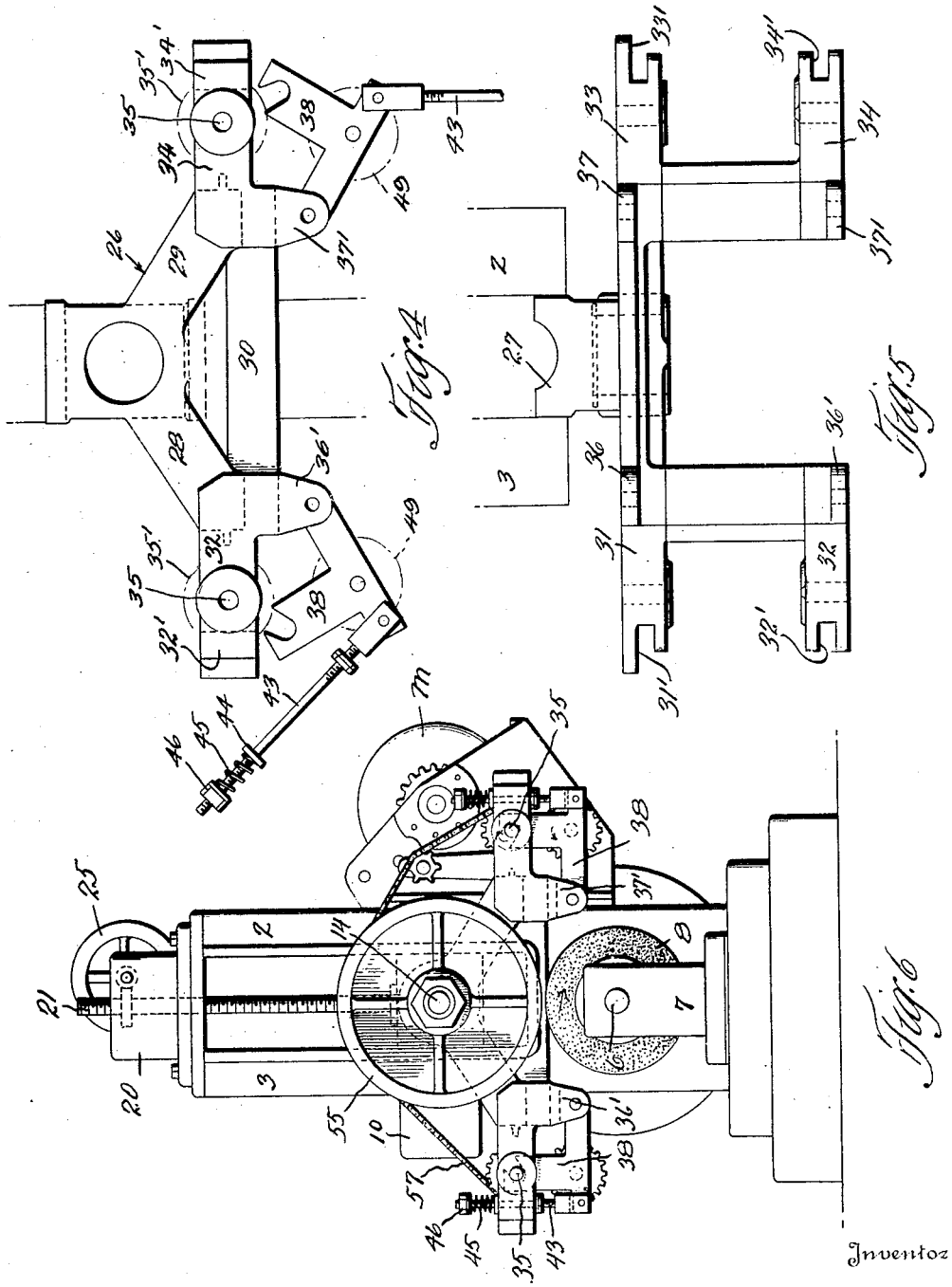

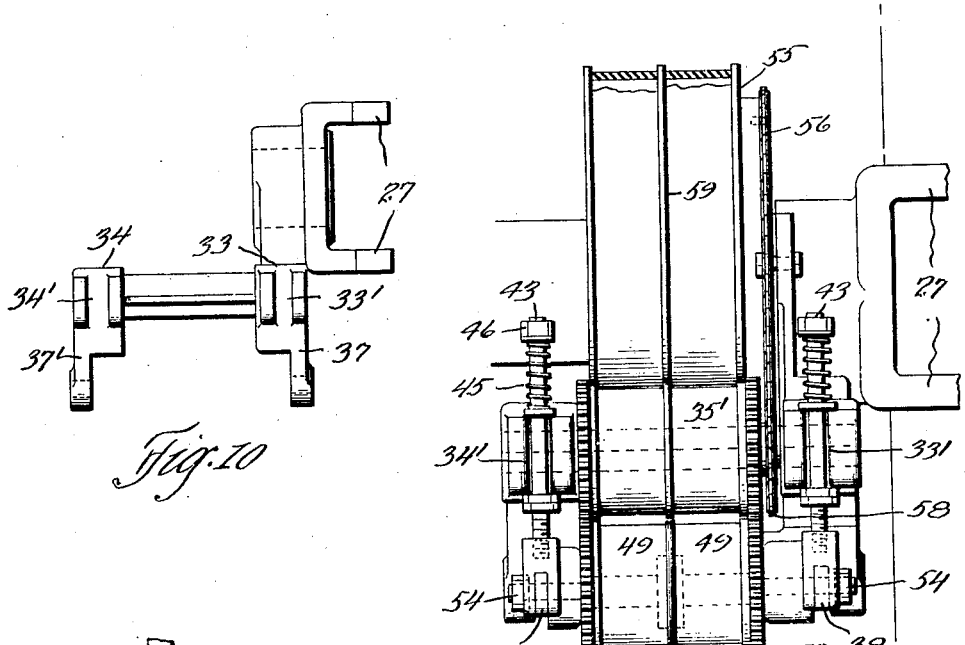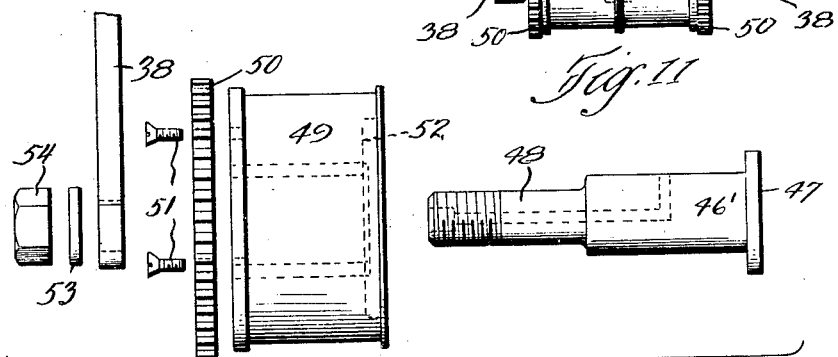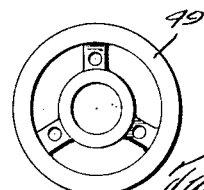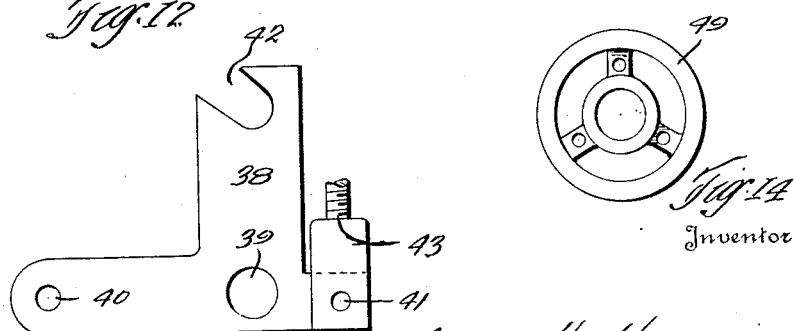

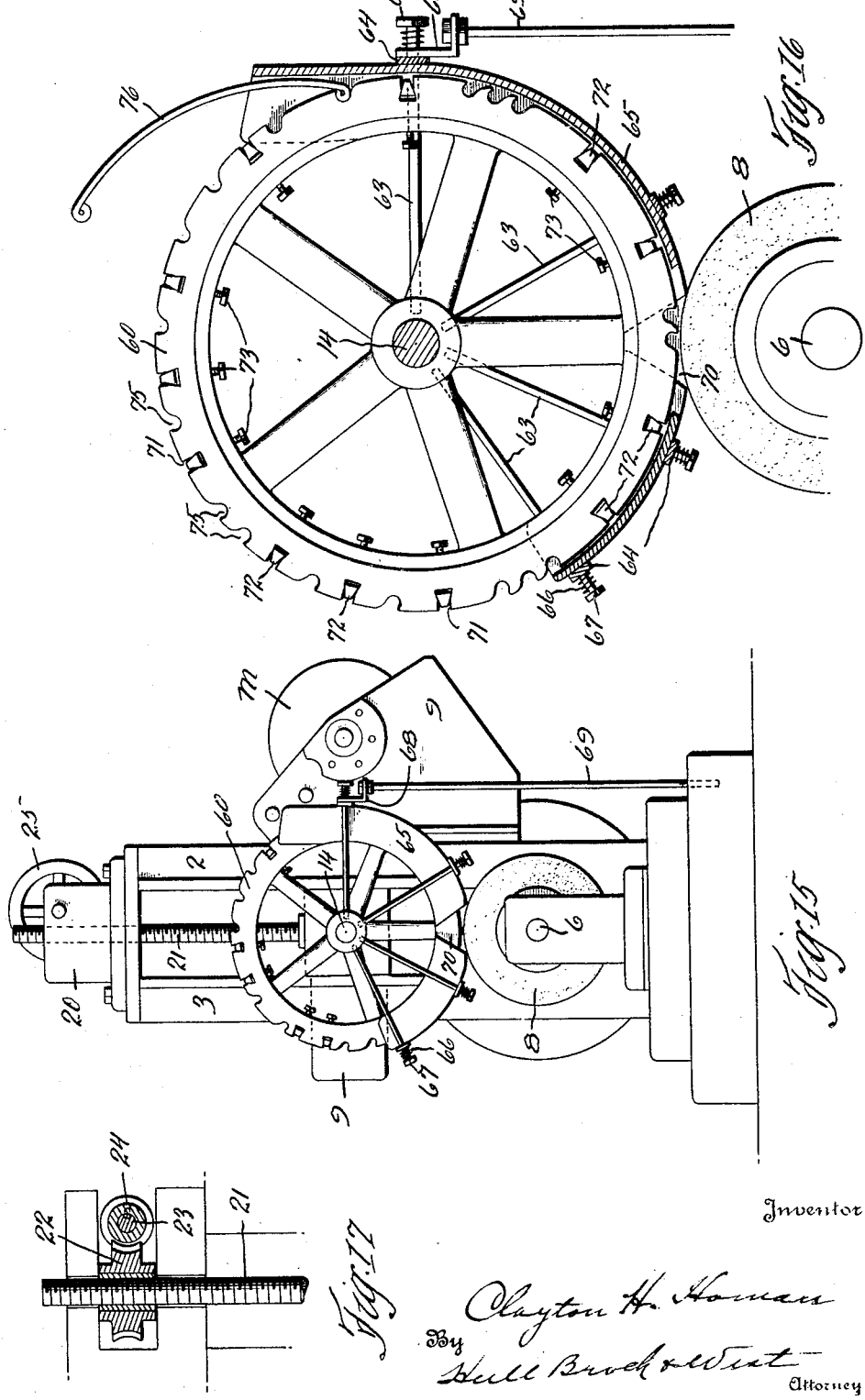

Oct. 11, 1932.                C. H. HOMAN                1,881,629
                       BUMPER GRINDING MACHINE
                  Filed Jan. 18, 1926      8 Sheets-Sheet 8
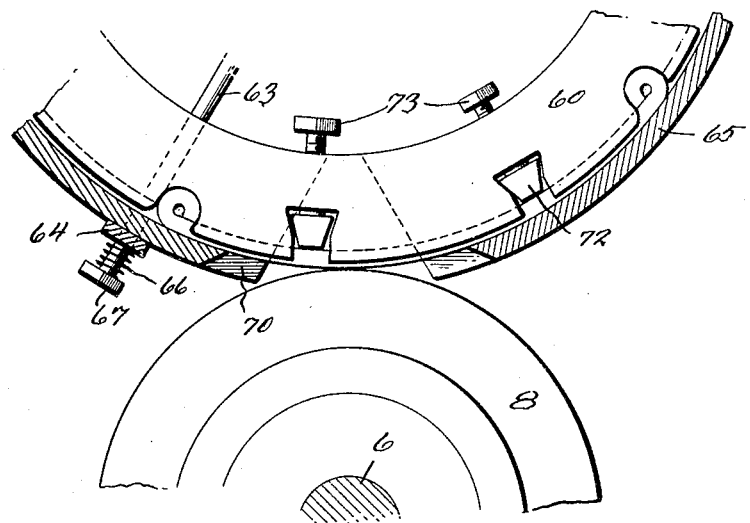
Fig. 18
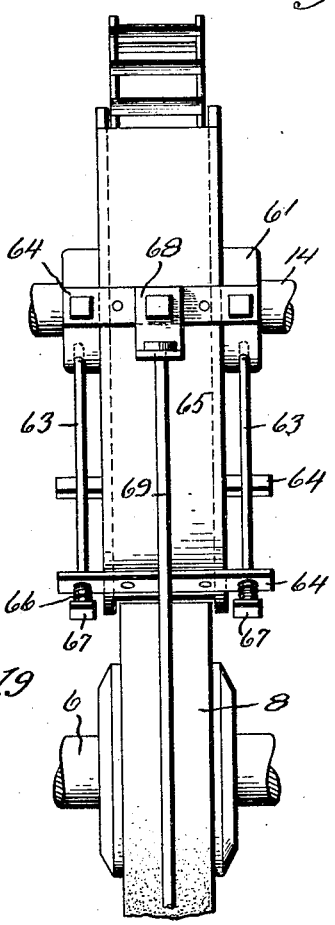
Fig. 19
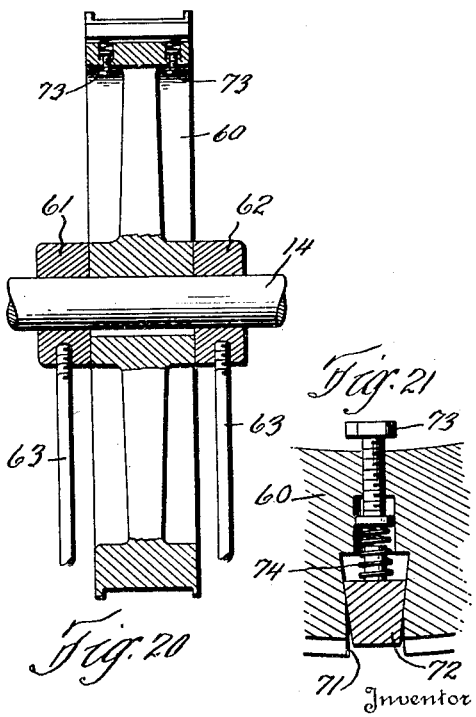
Fig. 20
Fig. 21
Inventor
Clayton H. Homan
By Hull Brock & West
           Attorney Patented Oct. 11, 1932

1,881,629

UNITED STATES PATENT OFFICE

CLAYTON H. HOMAN, OF CLEVELAND, OHIO, ASSIGNOR, BY MESNE ASSIGNMENTS, TO GENERAL SPRING BUMPER CORPORATION, A CORPORATION OF MICHIGAN

BUMPER GRINDING MACHINE

Application filed January 18, 1926. Serial No. 81,931.

This invention relates to a machine for grinding bumper bars and one of the objects of the invention is to provide a machine which is rigid in construction and dependable in operation and which comprises comparatively few parts and which is designed to operate at maximum capacity over long periods of time without adjustment or attention.

Another object of the invention is to provide a machine which is capable of adjustment for different size bumper bars and which is provided with means for compensating and allowing for irregularities in the surface of the bars.

Another object of the invention is to provide an automatic machine which will grind curved bumper bars as well as straight bars with accuracy and precision and to provide a machine which will require only the substitution of an attachment which will adapt it for use with curved bumper bars.

A still further object of the invention is to provide a feeding mechanism which may be adjusted with respect to the grinding element and which is so constructed as to allow for irregularities in the surface of the bumper bars as the same are being fed across the grinding element.

Drawings

In the accompanying drawings Fig. 1 is a plan view of my device showing the attachment secured thereto for use with straight bumper bars; Fig. 2 is a side elevation of the same; Fig. 3 is a sectional view taken on the line X—X of Fig. 1; Fig. 4 is a detail end view of a portion of my device showing the mounting for the rollers for feeding and guiding straight bars into the grinding device; Fig. 5 is a plan view of the mounting device shown in Fig. 4; Fig. 6 is an end elevation of the device for grinding straight bars; Figs. 7 and 8 are a side elevation and a plan view respectively of the supporting shelf or base on which a part of the operating mechanism is mounted; Fig. 9 is an end elevation of the shelf with the operating mechanism removed; Fig. 10 is a side elevation of the frame member shown in Figs. 4 and 5 but on a reduced scale; Fig. 11 is an enlarged detail view in side elevation of the frame member and the feed rollers mounted thereon; Fig. 12 is a disassembled view of one of the feed rollers showing the relative positions of the several parts; Fig. 13 is a detail view of one of the roller supports; Fig. 14 is an end view of one of the rollers with the gear removed therefrom; Fig. 15 is a front elevation of my device provided with an attachment for grinding curved bumper bars; Fig. 16 is an enlarged view in front elevation of the feed wheel for curved bumper bars with the guard member shown in section; Fig. 17 is an enlarged detail view of the mechanism for raising and lowering the feed wheel; Fig. 18 is a front elevation of a part of the feed wheel shown in Fig. 16 with the guard shown in section; Fig. 19 is a side elevation of the feed wheel and grinding element; Fig. 20 is a sectional view of the feed wheel shown in Fig. 16 but at right angles thereto and Fig. 21 is an enlarged detail sectional view of a part of the feed wheel shown in Fig. 16, showing how the wedge blocks are secured.

Specification

Mounted on a base 1 are four upright supports or standards shown at 2, 3, 4 and 5, and near one end of the base is mounted a high speed motor M which drives a shaft 6 supported in suitable bearings between the upright supports. One end of the shaft projects outwardly to the left as shown in Fig. 2 and is supported in a bearing block 7. Keyed to this shaft and rotatable therewith is a rotary grinding element 8.

A suitable bracket or supporting shelf 9 is shown in detail in Figs. 7 and 8. This shell is designed to be supported by and between the upright standards 2, 3, 4 and 5. The shelf 9 is provided with a right angularly extending portion 10 and extending from this portion in opposite directions are projections 11 and 12, and on one side of the shelf is a lug or extension 13. The portions 11 and 12 extend between the supports 2 and 3, and between 4 and 5, respectively, and the extension 13 is adapted to bear upon the support 2. The shelf is slidably supported between the standards as clearly shown in Fig. 1. The projections 11 and 12 have openings therein as clearly shown in Fig. 7 and provide a bearing for a shaft 14, the purpose of which will hereinafter appear. Mounted on the shelf 9 is a second motor m and a transmission T. The motor m drives a shaft 15 supported in suitable bearings in the transmission T and in the end of the shelf 9. Non-rotatably supported on the shaft 15 is a gear 16 which meshes with a second gear 17' (Fig. 3) mounted on a stub shaft 18 which gear in turn meshes with a ring gear 17 which is keyed to shaft 14 which is supported in bearings in the projections 11 and 12 as hereinbefore described.

Extending across and supported by the standards 2 and 3 is cross head 19 and mounted on this cross head is a block 20. This block 20 has an opening therein through which passes a screw threaded rod 21 which is securely attached at its lower end to the shelf 9. The upper end of the rod 21 has a worm gear 22 threaded thereon and the worm gear is confined within a recess in the block 20 as clearly shown in Fig. 17. A similar block 20' (Fig. 1) is supported on the standards 4 and 5. This block and its associated parts are identical with the block 20 and a detailed description is not considered necessary. Extending through both blocks is a shaft 23 having a worm wheel 24 (Fig. 17) thereon which meshes with worm gear 22 and a similar worm wheel for meshing with the worm gear in the block 20'. The shaft is provided with a handle 25 for operating the same. It will now be clear that upon rotation of the shaft 23 the shelf 9 and its associated parts may be raised or lowered as desired.

The shaft 14 projects outwardly to the left (as seen in Figs. 1 and 2) and mounted on this shaft is a frame member 26, shown in detail in Figs. 4 and 5. This frame member 26 is secured against rotation with respect to the shaft 14 by means of a projection 27 which projects between the posts or standards 2 and 3. The frame member comprises a pair of diverging arms 28 and 29 and a cross arm 30. The frame member is also provided with a pair of spaced parallel outwardly projecting arms 31 and 32 having bifurcated outer ends as shown at 31' and 32'. A similar pair of arms 33 and 34 are provided on the opposite side of the frame member. The arms 31 and 32 are adapted to receive and form a bearing for the opposite ends of a shaft 35 on which is mounted a feed roller 35' having gears secured to the opposite ends thereof as shown in Fig. 11, the purpose of which will hereinafter appear. The oppositely disposed arms 33 and 34 support a roller which is identical with the roller 35'.

The frame member is also provided with downwardly projecting spaced parallel arms 36 and 36' on one side and a similar pair of arms 37 and 37' on the opposite side. Pivotally secured to the lower ends of each of the arms 36 and 36' and 37 and 37' is a member 38. As each of the members 38 are identical only one will be described in detail. The member 38 is shown in detail in Fig. 13 and is provided with openings 39, 40 and 41 and a recess 42. The member 38 is pivotally secured to the lower end of the arm 36' through the opening 40 as shown in Fig. 4. Pivotally secured in the opening 41 is an arm 43 bifurcated at its lower end. The upper end of the arm 43 is screw-threaded and is provided with a collar 44, a spring 45 and a nut 46. The upper end of the arm 43 is adapted to engage in the bifurcated end 32' of the arm 32 so as to provide a resilient support for the outer end of the member 38, and the recess 42 is adapted to engage the projecting end of shaft 35. (See Fig. 4). Secured within the opening 39 of the member 38 is a stub shaft 46' having a shoulder 47 at one end and a reduced screw threaded portion at its opposite end as shown at 48 in Fig. 12. Rotatably mounted on the stub shaft 46' is a feed roller 49 having a ring gear 50 secured thereto by means of screws 51. The right hand end of the roller 49 is provided with a countersunk portion 52 shown in dotted lines in Fig. 12 which receives the shouldered portion 47 of the stub shaft 46'. The stub shaft passes through the roller and is secured in the opening 39 in the member 38 by washer 53 and a nut 54. It will now be clear that each member 38 supports a feed-roller 49 and each of the rollers 49 may be moved away from the roller 35' against the tension of the spring 45 as most clearly shown in Figs. 6 and 11. It will also be clear that a single roller 35' is supported between the arms 31 and 32 and that a pair of rollers 49 are independently and resiliently supported below the roller 35'. The gear 50 on each roller 49 is adapted to mesh with similar gears on the opposite ends of the roller 35'. Mounted on the outer end of shaft 14 so as to rotate therewith is a feed wheel 55 having a ring gear 56 secured thereto. The feed wheel 55 is also provided with an annular shoulder 59 the purpose of which will hereinafter appear. Mounted on each shaft 35 so as to rotate therewith is a gear 58. Extending around the ring gear 56 and each gear 58 is a sprocket chain 57. It will now be clear that upon rotation of the shaft 14 the feed wheel 55 together with the ring gear 56 will be rotated, and due to the connection between the gear 56 and the gears 58 on the shafts 35 by means of the sprocket chain 57 the roller shafts 35 will also be driven, and as the gears on the rollers 35' and 49 intermesh it will be clear that the rollers 49 will be driven in one direction and the rollers 35' will be driven in the opposite direction. In other words when the shaft 14 and feed wheel 55 are driven in a clockwise direction as seen in Fig. 6 the upper rollers 35′ will be driven in a clockwise direction, and the lower rollers 49 will be driven in a counter clockwise direction. It should also be noted that the rotary grinding element 8 and the feed wheel 55 are driven in the same direction. The grinding element is driven at a high speed and the feed wheel at a slow speed.

*Operation*

The rotary grinding element 8 is driven at a high speed by means of the motor M in a direction which we will assume as clockwise as viewed in Fig. 6. The mechanism for feeding the bumper bars into the machine is driven by the motor m through the transmission T and the reducing gearing 16, 17′, 17 and shaft 14. The feed wheel 55 is keyed to the shaft 14 and rotates therewith as does also the ring gear 56 which is secured to the feed wheel 55. By means of the sprocket chain 57 which connects the ring gear 56 with the gears 58 on the shafts 35 the uppermost feed rollers 35′ are driven in a clockwise direction and due to the intermeshing gears on the feed rollers the lowermost rollers 49 are driven in a reverse or counterclockwise direction. The feed wheel 55 as will be seen in Figs. 1 and 6 lies immediately above the rotary grinding element 8. The feed wheel and its driving mechanism are supported and carried by the shelf 9. The shelf 9 may be raised or lowered by rotation of the hand wheel 25 which through the shaft 23 worms 24 and worm wheel 22 and threaded rod 21, which is attached to the shelf, operates to raise or lower the shelf to vary the distance between the feed wheel and grinding element.

The bumper bars to be ground are fed two at a time in between the feed rollers 49 and 35′ at the right side of the machine as seen in Fig. 6. These rollers are rotating in opposite directions and pull the bars into the machine toward the grinding element. The feed wheel is adjusted by means of the handle 25 to exert more or less pressure on the bars. The feed wheel, with the annular shoulder 59, tends to pull the bar across the grinding element towards the feed rollers on the opposite side. The bars are moved slowly across the grinding element by the feed wheel and feed rollers, and the pressure of the bars against the grinding element may be adjusted by the hand wheel 25. Due to the resilient mounting of the lower rollers, bars of different thickness may be fed through the machine at the same time, or in other words the resilient mounting compensates for irregularities in the surface of the bars.

In Figs. 15–21 inclusive I have shown a modification of my device in the form of an attachment which is adapted for grinding fender guards such as are used on the rear of automobiles to protect the rear fenders. The operating mechanism is the same but instead of the feed wheel 55 which is used when grinding straight bumper bars, I substitute a feed wheel 60 shown in detail in Figs. 16–21 inclusive. The frame member 26 is also not necessary and is removed. The feed wheel 60 is adapted to be secured to the shaft 14 so as to rotate therewith and so positioned as to be immediately above and in close proximity to the grinding element 8. Positioned on the shaft 14 on each side of the feed wheel 60 are a pair of collars 61 and 62, and secured to these collars are a plurality of spokes 63. The spokes 63 are connected at their outer ends by a plurality of cross bars 64 which are slidable on the spokes 63, and rigidly connected with the cross bars 64 is an arc shaped guard 65 as most clearly shown in Fig. 16. Due to the springs 66 and nuts 67 on the spokes 63 it will be clear that the guard 65 and its associated parts may have a limited sliding movement on the spokes 63 in a radial direction against the tension of the springs 66, the purpose of which will hereinafter appear. Attached to one of the cross arms 64 by means of an L-shaped clamp 68 is a rod or supporting arm 69 which is rigidly secured to the base. This arm 69 supports the guard 65. The guard 65 is also provided with a cut out inverted V-shaped portion as at 70, immediately above the rotary grinding element 8, to allow contact between the latter and the curved bar being ground. The feed wheel is provided at spaced intervals with recesses 71 in which blocks or wedges 72 are slidably, adjustably and resiliently mounted, as most clearly shown in Fig. 21, the threaded pin 73 serving to adjust the tension of the spring 74 which urges the block 72 outwardly in a radial direction with respect to the feed wheel 60. The feed wheel 60 is also provided with a plurality of notches 75 which are adapted to receive and retain the opposite ends of a curved bumper bar 76 as shown in Fig. 16. The feed wheel 60 is driven in a clockwise direction at a slow speed while the grinding element is driven in the same direction at a high speed. The bumper bars are fed into the feed wheel 60 as shown in Fig. 16 and are carried down across the rotary grinding element. The guard 65 will give as the bar 76 passes over the inner surface of the same and the bar will be thereby resiliently held against the periphery of the feed wheel 60. The feed wheel and its associated parts may be raised or lowered by means of the hand wheel 25 to vary the pressure between the bumper and the grinding element. The resilient mounting of the guard 65 and the resiliently mounted wedge blocks 72 compensate and allow for irregularities in the bumper bars.

It will now be clear that I have provided a device which will accomplish the objects of the invention as hereinbefore stated.

Having thus described my invention, what I claim is:

1. In a machine for grinding bumper bars, a rotary grinding element, mechanism for feeding bumper bars across said grinding element, said mechanism including a feed shaft, a feed wheel mounted on said shaft, a frame member mounted on said shaft and secured against movement therewith, said frame member having portions extending on opposite sides of said feed wheel, a feed roller rotatably mounted in each of said extending portions, a pair of rollers resiliently mounted in each of said portions below said first named rollers whereby to allow a limited movement of said lower rollers with respect to said upper rollers, and a driving connection between said feed wheel and said upper and lower rollers.

2. A grinding machine including a grinding element, a feed wheel adapted to bear upon the work to be ground as it passes across the grinding element, a rotatable shaft supporting said feeding wheel, means for regulating the distance between said shaft and the grinding element, and auxiliary feed wheels supported from said shaft and driven therefrom.

3. In a grinding machine, the combination with a grinding element, of a rotatable shaft mounted for movement relative to said grinding element, a member supported from said shaft, means for preventing the rotation of said member with said shaft, a feed wheel mounted on a shaft carried by said member and adapted to bear upon a surface of work passing through the machine, a second feed wheel mounted upon a shaft carried by a member pivotally connected to said first mentioned member and adapted to bear upon the opposite surfaces of said work, and resilient means for varying the distance between said feed wheels.

4. In a bar grinder adapted to grind a plurality of bars at the same time, the combination with a grinding element, of a feed wheel adapted to bear upon surfaces of the bars, a plurality of separately supported feed wheels adapted to bear upon opposite surfaces of the bars and means for compensating for varying thicknesses of bars simultaneously passing through the grinder, said means consisting of a pivoted support adapted to carry shafts upon which the separately supported feed wheels rotate, and resilient means for supporting the free end of said pivoted support.

In testimony whereof, I hereunto affix my signature.

CLAYTON H. HOMAN.